UNITED STATES PATENT OFFICE.

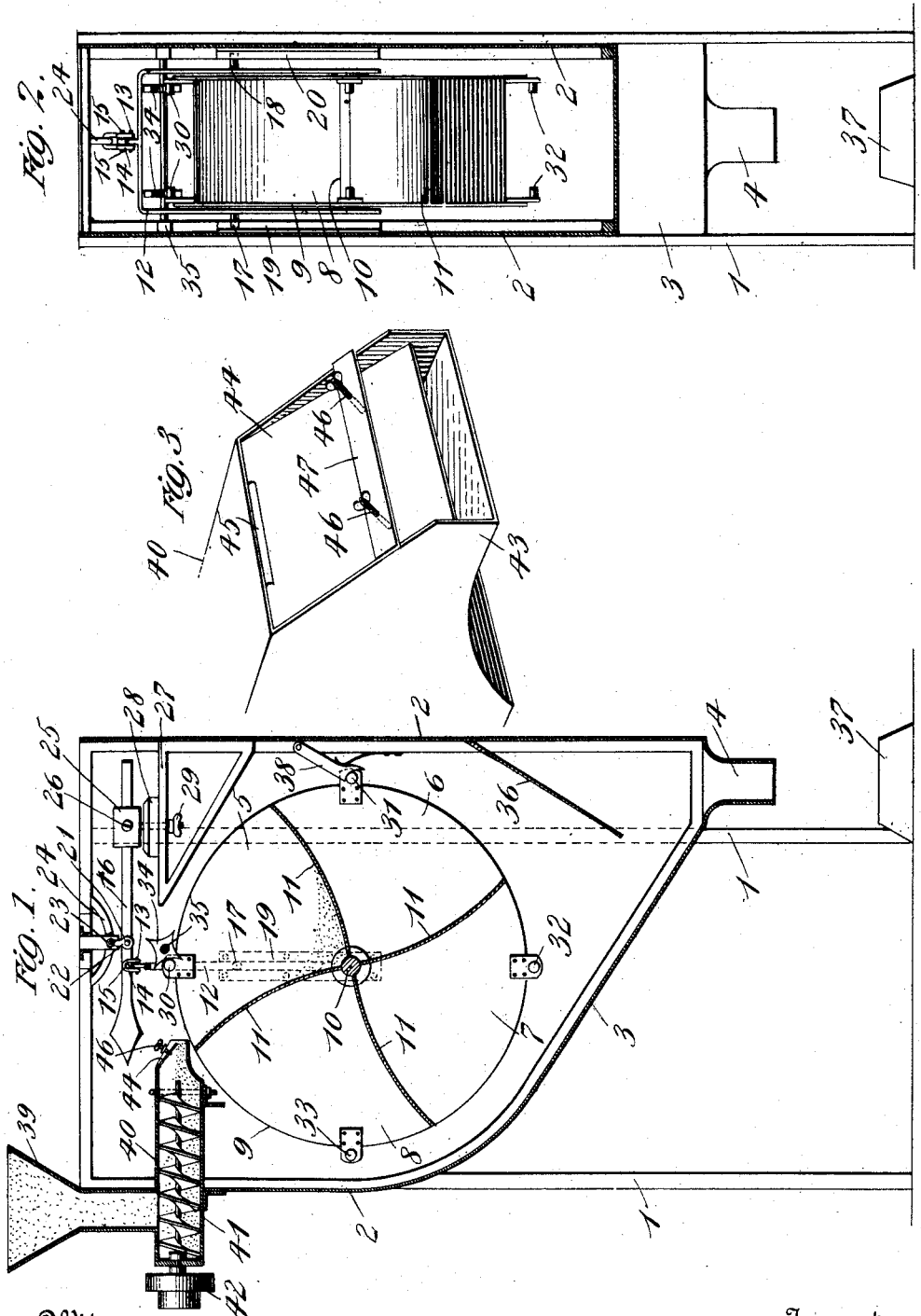

LEWIS DEPEW, OF PHILLIPSBURG, NEW JERSEY, ASSIGNOR TO EDWARD L. BUSCHMAN, OF EAST ORANGE, NEW JERSEY.

AUTOMATIC WEIGHING AND PACKING MACHINE.

981,391.     Specification of Letters Patent.     Patented Jan. 10, 1911.

Application filed December 22, 1908. Serial No. 468,783.

*To all whom it may concern:*

Be it known that I, LEWIS DEPEW, a citizen of the United States, residing at Phillipsburg, Warren county, State of New Jersey, have invented certain new and useful Improvements in Automatic Weighing and Packing Machines, of which the following is such a full, clear, and exact description as will enable any one skilled in the art to which it appertains to make and use the same, reference being had to the accompanying drawings, forming part of this specification.

My invention relates to an apparatus for automatically weighing a certain predetermined quantity of material and discharging it from the weighing receptacle as soon as such weight is reached. In an apparatus of this class and in which the material is supplied thereto in a practically constant manner, much difficulty has heretofore been experienced in cutting off the supply at the proper moment or in stopping the weighing receptacle from receiving the material after the exact predetermined quantity has been supplied thereto.

In my present invention I provide automatic mechanism whereby the weight of the predetermined quantity itself serves to prevent further material from being supplied to the particular weighing receptacle the moment such weight is reached.

I further seek to provide means whereby the weighed material when automatically discharged from its weighing receptacle may be deposited in a bag or other packing or storing vessel.

With these and other objects in view, my invention consists in the various novel and peculiar combinations and arrangements of the different parts of the apparatus all as hereinafter fully described and then pointed out in the claims.

I have illustrated a type of my invention in the accompanying drawings, wherein;

Figure 1 is a view of a section of my improved apparatus, the plane of which section is taken on a vertical plane. Fig. 2 is a view of a vertical section, the plane of which is taken at right angles to that of Fig. 1. Fig. 3 is an enlarged perspective view of the end of the feed spout.

Referring to the drawings in which like numbers of reference desigate like parts throughout, 1 indicates a suitable frame work within which is mounted an inclosing casing 2, the bottom of which is inclined at 3 so as to direct the material deposited therein from the weighing receptacle, to a discharge opening 4 in the bottom of the casing.

Within the casing 2 is mounted one or more movable or revolving weighing receptacles 5, 6, 7 and 8 which revolve about a horizontal axis. In the present construction, these weighing receptacles are formed as substantially equal sized compartments in a drum 9 which turns on an axle or shaft 10, each compartment being completely open at the periphery of the drum. The compartments are formed by the radial partitions 11 which are slightly curved, each in the same direction. The outer ends of the shaft 10 to the exterior of the drum are mounted to turn in the lower ends of a yoke or bail 12 which spans the upper part of the drum and which is pivoted at 13 to links 14 which ride on pins 15 fixed on scale beam 16. The respective sides of the yoke 12 are provided with guide pins 17, 18, which move in vertical guides 19, 20, secured upon the inner side of the casing 2. The scale beam 16 is pivoted at 21 to the part 22 which swings on a pivot 23 on a bracket 24 in the upper part of the frame work. An adjustable weight 25 is mounted on the scale arm and is provided with a set screw 26 for holding it in position when it is adjusted to weigh a predetermined amount of material. Beneath the scale arm is arranged a bracket 27 provided with a rest 28 in which is vertically mounted a vertically adjustable screw 29, the upper end of which projects above the rest 28 so as to come in contact with the weight 25 and for the purpose of keeping the same in horizontal position when the scale arm is balanced. The revolving drum 9 for carrying the set of weighing receptacles is thus operatively connected with the weighing scale and its relation is such that the presence of any of the material to be weighed in the uppermost receptacle, tends to revolve the drum in the direction in which the hands of a clock move, as indicated in Fig. 1. The weighing receptacles are provided with pairs of stop pins 30, 31, 32, 33, respectively. The stop pins of the uppermost receptacle rest against the concave parts of a pair of star wheels 34 mounted on an arbor 35, when the parts are in normal position, as shown in Fig. 1, and this serves to keep the weighing receptacle or drum from turning on the axis 10 while the uppermost receptacle is being charged, at the same time it permits the weight of the material in the receptacle to cause the drum to gradually descend in a vertical direction by means of the pins 17, 18 and the guides 19, 20. It will be noted that the star wheels 34 with the arbor turn with some little friction and that the stop pins 30 stand just a little below the level of the arbor 35 so as to be slightly off a dead center. As the weight of the material in the upper receptacle gradually carries down the drum, the stop pin 30 moves downwardly along the lower point of the star wheel and thereby increases its leverage on it until the point is reached when the wheel is then given a partial turn on its axis and the pins permitted to escape. The parts are so related that when the uppermost receptacle has received the predetermined quantity of material, the drum 9 has descended sufficiently far to permit the pins 30 to escape beneath the star wheels 34 whereupon the weighed quantity of material in the receptacle 5 quickly turns the drum on its axis 10 and brings the receptacle 5 in the position of the receptacle 6, Fig. 1, and thereby empties itself into the lower part of the casing 2 and against the deflector 36 from which the material falls onto the incline 3 and thence passes out of the discharge opening 4, from which it may be received by a suitable bag or other receptacle which may at the time be placed upon a support 37. When the receptacle 5 is moved into the position of 6 in Fig. 1, the stop pin 30 has passed into the position of the stop pin 31 of that figure and snapped under the spring dog 38, which thereby prevents backward rotation of the drum. This same operation is repeated with the next weighing receptacle 8 which then takes the position of that shown at 5 in Fig. 1 and this operation is repeated.

While I have shown but one way in which the weighing receptacles are given a swinging or angular movement about a horizontal axis, namely by means of a rotary drum having peripheral weighing compartments, it is evident that the angular or turning movement of the weighing receptacle may be obtained in other ways.

The material to be weighed is supplied constantly to the apparatus from a hopper 39 which empties into a horizontally arranged pipe 40 within which operates a spiral conveyer 41 which is operated by a pulley 42 in a suitable manner. This pipe or chute 40 has its end provided with a spout or nozzle 43 which empties directly into the rear end of the weighing receptacle, as indicated in Fig. 1. This spout 43 is provided with a movable lip or part 44 which is hinged at 45. Near its outer end the lip 44 is provided with a pair of adjusting screws 46 which pass through threaded openings in a cross piece 47 and have their lower ends pivoted to the lip so that the turning of the screws 46 in their threads in the cross piece 47 will act to adjust the lip 44 on its hinge in order to decrease or increase the size of the discharge opening of the nozzle. The size of the discharge opening may be varied according to the character of the material and the rapidity with which it is desired to feed the material to the weighing receptacle. For example, if the lip be set so that the opening is say about one-half inch, the speed of the feeding movement is reduced while if it be set at one and one-half inches, the speed is very much increased.

Having thus described my invention what I claim and desire to secure by Letters Patent is:—

1. In an automatic weighing machine, the combination with a drum turning on a horizontal axis and provided with peripheral pockets for receiving the material to be weighed, scales having a scale-beam mounted centrally above said drum, a vertically movable bail suspended from said scale-beam and having said drum mounted in the ends thereof so as to support the same, vertical guides at the respective sides of said bail and projections on the sides of said bail engaging said guides, means for holding said drum from turning on its axis while the material is supplied thereto, and means for supplying the material to a pocket in the drum, substantially as and for the purpose set forth.

2. In an automatic weighing machine, the combination with a drum turning on a horizontal axis and provided with peripheral pockets for receiving the material to be weighed, scales having a scale-beam mounted centrally above said drum, a vertically movable bail suspended from said scale-beam and having said drum mounted in the ends thereof so as to support the same, means for holding said drum from turning on its axis such means comprising a stop on the drum, one for each pocket thereof, a rotary toothed friction device located above the horizontal plane containing the axis of rotation of the drum and adapted to be normally engaged by the stop of the pocket that is being filled and said stop gradually moving downwardly out of engagement with a tooth of said friction device as the weight of material increases and finally escaping said friction device when the predetermined weight is reached, and means for supplying material to one of said pockets at a time, substantially as and for the purpose set forth.

3. In an automatic weighing machine, the combination with a drum turning on a horizontal axis and provided with peripheral pockets for receiving the material to be weighed, scales operatively connected with and supporting said drum, and the latter having a vertical movement, means for holding said drum from turning on its axis, such means comprising a stop on the drum, one for each pocket thereof, a rotary toothed friction device located above the horizontal plane containing the axis of rotation of the drum and adapted to be normally engaged by the stop of the pocket that is being filled and said stop gradually moving downwardly out of engagement with a tooth of said friction device as the weight of material increases and finally escaping said friction device when the predetermined weight is reached, and means for supplying material to one of said pockets at a time, substantially as and for the purpose set forth.

4. In an automatic weighing machine, the combination with a drum turning on a horizontal axis and provided with peripheral pockets for receiving the material to be weighed, scales operatively connected with and supporting said drum, and the latter having a vertical movement, means for holding said drum from turning on its axis, such means comprising a stop on the drum, one for each pocket thereof, a toothed wheel located above the horizontal plane containing the axis of rotation of the drum and adapted to be normally engaged by the stop of the pocket that is being filled and said stop gradually moving downwardly out of engagement with said toothed wheel as the weight of material increases and finally escaping said toothed wheel when the predetermined weight is reached, said toothed wheel having the spaces between the teeth thereof inwardly curved for engagement with said stops, a spring-actuated dog adapted to engage each of said stops on the drum in turn for holding the drum against backward rotation, and means for supplying material to one of said pockets at a time, substantially as and for the purpose set forth.

In testimony whereof, I have hereunto set my hand in the presence of the two subscribing witnesses.

LEWIS DEPEW. [L. S.]

Witnesses:
 JAMES VAN BILLIARD,
 NATHAN M. FEGELY.